Nov. 9, 1937.    S. J. JONES    2,098,581
COUPLING
Filed Aug. 8, 1934
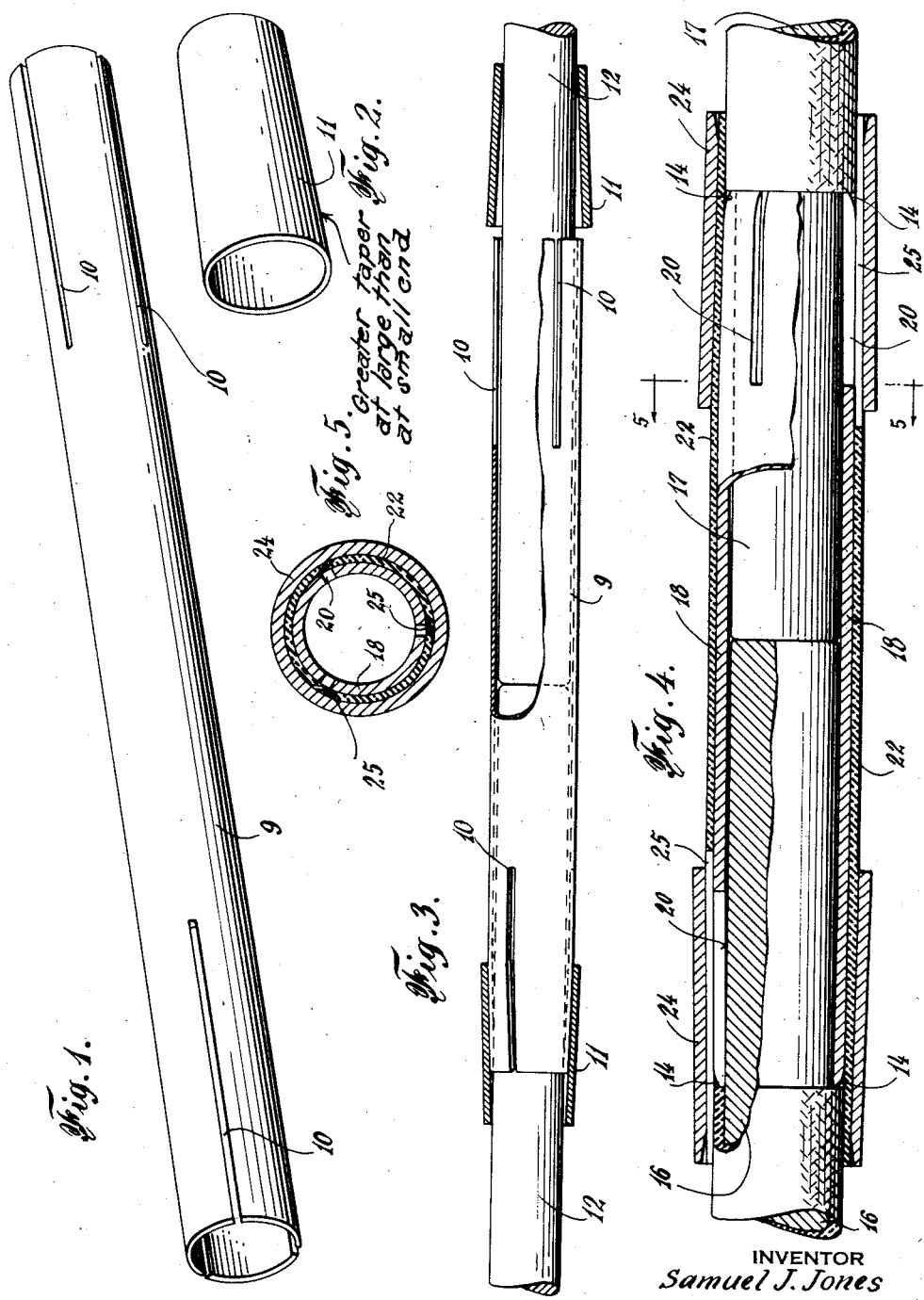
INVENTOR
Samuel J. Jones
BY
Sheldon H. Travee
ATTORNEY Patented Nov. 9, 1937

2,098,581

UNITED STATES PATENT OFFICE 2,098,581

COUPLING

Samuel J. Jones, New York, N. Y.

Application August 8, 1934, Serial No. 738,905

6 Claims. (Cl. 173—268)

This invention relates to couplings, such as couplings for securing extension handles to mops and brushes and poles, also shaft couplings, pipe, tube or rod couplings as well as couplings for electrical conductors and the like.

Briefly, my invention, in its preferred form, comprises a slotted tube or sleeve member which is adapted to embrace the rod, pipe or other fitting or object to be coupled and a ring having a conical or slightly tapered inner surface which is adapted to be slid or forced over one end of the sleeve member, thus in turn forcing the sleeve into a firm binding contact with the object.

Among the objects of my invention are to provide a coupling of this character which is extremely simple in construction, inexpensive to manufacture, one which may be readily coupled and uncoupled and when coupled is able to withstand excessive tension.

Other objects and advantages of my invention will appear from the following description taken in connection with the accompanying drawing which shows one embodiment of my invention and wherein:

Figure 1 is a perspective view of a slotted sleeve forming part of the coupling;

Figure 2 is a perspective view of one of the tapered ring members adapted to cooperate with the sleeve to force the sleeve onto the object to be coupled;

Figure 3 is a sectional view partly an elevation of the sleeve, two rings and a portion of two rods in assembled relation with the rings in position to be forced onto the sleeves to couple the rods together;

Figure 4 is a view similar to Figure 3 but showing the use of my improved coupling for connecting electrical conductors; and Figure 5 is a sectional view taken on the line 5—5 of Figure 4.

The tube 9 shown in Figure 1, which may be made of metal, such as brass, steel or other strong resilient material, is formed with three (or more) inwardly extending slots 10 at each end, the effect of which is to give the portions of the tubes adjacent the ends some flexibility. The tapered ring or tube 11 shown in Figure 2 is formed of strong material, preferably metal, and has its larger diameter sufficient to permit it to be passed over the end of the tube 9 and a smaller diameter somewhat less than the outer diameter of the tube 9. While the ring 11 is shown as having both inner and outer walls tapering, if more convenient to manufacture, the outer wall may be cylindrical rather than conical. It is to be noted, however, that neither the inner nor the outer wall of the tube 9 tapers, this tube being of uniform diameter throughout and the metal being of uniform thickness.

Figure 3 shows portions of two rods or poles 12 which may be of wood, metal or other material adapted to be joined by a coupler consisting of sleeve 9 and two of the rings 11. To couple the poles firmly together, it is merely necessary to force the rings 11 onto the sleeve 9 which may be readily done by hand. The sleeve 9 is forced tightly against the rods and the contacts between sleeves 9 and the rods 12 are facial contacts extending inwardly along the sleeve 9 considerable distances from the points of contact of the sleeve and the rings. If a greater area of contact is desired, the outer ends of the sleeve 9 may be beveled as shown at 14 in Figure 4. The bevel surface in the case of relatively large sleeves being a spherical surface as there shown and for smaller sleeves which will be of thinner metal, the bevel surface may be conical. With the spherical beveled sleeve, it is possible firmly to secure very heavy poles as, for example, it is possible to secure a mast to a ship by this construction. It is to be noted that the bevel surface is inclined at a greater angle to the axis of the sleeve than is the slight taper of the collar.

For securing together rods or poles of say 1 3/64 inches diameter, I find, for example, the following dimensions of parts suitable: Inner diameter of sleeve 1⅛ inches, thickness of metal of sleeve 1/32 inch; taper of inner wall of the ring 11, 1/32 of an inch per inch of length near its larger end and from then on to its smaller end 1/64 of an inch per inch in length. This taper has been considerably exaggerated in the drawing for the sake of clearness. In such cases however, dimensions of the parts should be such that when the ring or collar is forced into firm binding contact the end of the sleeve should be spaced ½ inch or more from the smaller end of the ring, otherwise with such a slight taper to the ring there is danger of splitting the ring in sliding it over the end of the sleeve.

In Figures 4 and 5 I have shown a similar means for joining together two electrical conductors 16 and 17. In this figure the metal tube 18 which forms the electrical conducting medium between the two conductors is formed at each end with three (or more) equidistant slots 20 and is chamfered or beveled at the end at 14 as previously explained. Reference character 22 represents an insulating tube of Bakelite or similar material which may be of uniform thickness and 24 represents the tapered rings. It will be noted that in this case tapered rings or collars bear on the insulation and through the insulation serves to force the tube 18 tightly against the metal conductors. In order to permit the closing in of the insulating tube, this tube is slotted as shown at 25, these slots being arranged opposite to slots 20 at an incline thereto as shown so that there is always insulating material between the conductor and the outer ring 24. It will be seen from Figure 4 of the drawing that the metal conductors abut one another. Also, that the metal sleeve 18 covers the entire bared portions of the cables 16 and 17 and abuts against the insulation surrounding these cables. The sleeve 18 is of substantially the thickness of the cable insulation, thus locating its outer surface substantially flush with the outer surface of the insulating cables. The flexible tube 22 of insulation overlaps the insulation of the cable, so that when the rings 24 are applied, all outer surfaces are properly insulated from the electrical conductor.

The construction shown in Figure 3 may also be used for connecting two conductors together in which case however, when the connection is made the entire joint will be covered by insulation or surrounded by a suitable insulating casing.

It is, of course, not necessary that both pole or shafts be detachably connected to the sleeve, one may be riveted to the sleeve and the other connection made in the manner above described.

Having now described my invention what I claim and desire to secure by Letters Patent is:—

1. Means for connecting two electrical conductors together, a metal sleeve slotted at both ends and surrounding said conductors, a tube of flexible insulation slotted at its ends and surrounding said sleeve and slightly tapered metal rings surrounding said tube and forcing said sleeve into firm facial contact with said conductors.

2. The combination with a member to be coupled, a metal slotted inner tube surrounding said member, an outer unslotted tube surrounding said inner tube, said outer tube having its inner surface slightly tapered with increasing taper from the small to the large end and said inner surface being normally slightly inclined to the other surface of the inner tube and adapted to exert pressure on the inner tube in the region of its outer edge and said outer tube forcing the metal of inner tube into facial contact with said member at points longitudinally removed from the outer edge.

3. The combination with a member to be coupled, a metal slotted inner tube surrounding said member, an outer unslotted tube surrounding said inner tube, said outer tube having its inner surface slightly tapered with increasing taper from the small to the large end and said inner surface being normally slightly inclined to the other surface of the inner tube and adapted to exert pressure on the inner tube in the region of its outer edge and said outer tube forcing the metal of inner tube into facial contact with said member at points longitudinally removed from the outer edge and said inner tube being abruptly beveled at its outer edge.

4. Means for connecting two electrical conductors together, a metal sleeve slotted at both ends and surrounding said conductors, a tube of flexible insulation slotted at its ends and surrounding said sleeve and rings each having an inner surface slightly tapered in one direction only from one end of the ring to the other, said rings being adapted to be pushed over said insulation, forcing said sleeve into firm facial contact with said conductors.

5. In means for connecting ends of two insulated conductors, said conductors being bared of insulation adjacent said ends, a metal sleeve of substantially uniform inner dimensions slotted at opposite ends embracing the bared ends of said conductors, said sleeve being of substantially the thickness of the insulation, a tube of flexible insulation surrounding said metal sleeve and overlapping the conductor insulations and slightly tapered metal rings surrounding said tube and forcing said sleeve into facial contact with said conductors.

6. In means for connecting ends of two insulated conductors, said conductors being bared of insulation adjacent said ends, a metal sleeve of substantially uniform inner diameter slotted at opposite ends, embracing the bared ends of said conductor and abutting the insulation of said conductors, said sleeve being of substantially the thickness of the insulation, a tube of flexible insulation surrounding said metal sleeve and overlapping the conductor insulations and slightly tapered metal rings surrounding said tube and forcing said sleeve into facial contact with said conductors.

SAMUEL J. JONES.